(No Model.)  5 Sheets—Sheet 1.

A. RUNSTETLER.
WALKING CORN PLANTER AND FERTILIZER DISTRIBUTER.

No. 295,132. Patented Mar. 11, 1884.

(No Model.) 5 Sheets—Sheet 4.
A. RUNSTETLER.
WALKING CORN PLANTER AND FERTILIZER DISTRIBUTER.
No. 295,132. Patented Mar. 11, 1884.
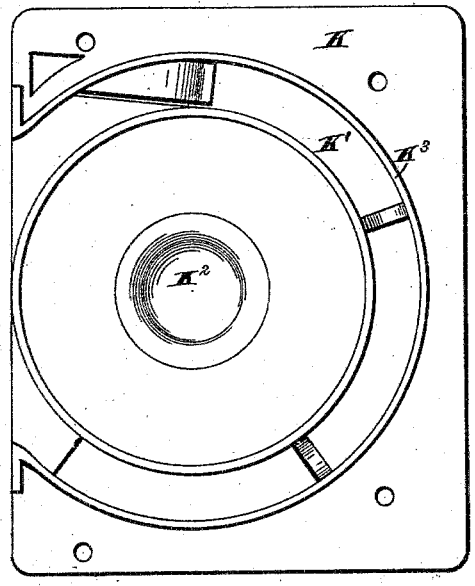
Fig. 4.
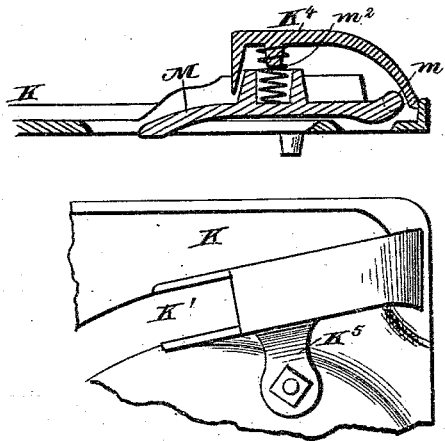
Fig. 5.
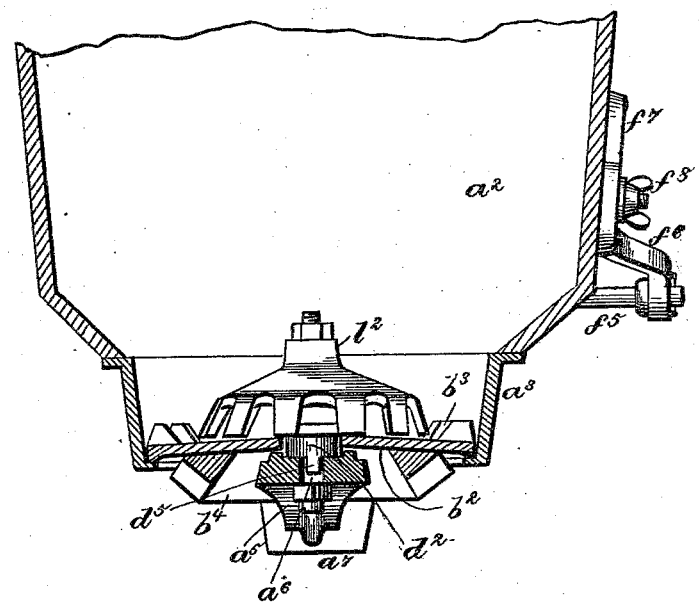
WITNESSES
Robert Everett
George W. Rea
INVENTOR
Andrew Runstetler
By James L. Norris
Attorney (No Model.) 5 Sheets—Sheet 5.
A. RUNSTETLER.
WALKING CORN PLANTER AND FERTILIZER DISTRIBUTER.
No. 295,132. Patented Mar. 11, 1884.
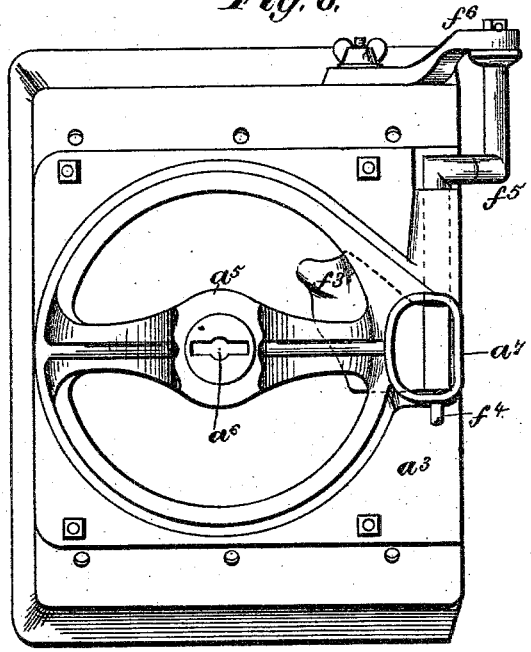
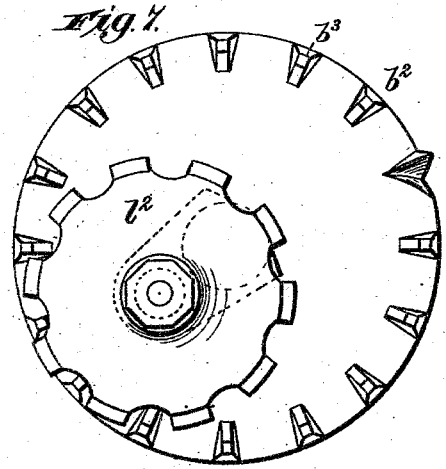
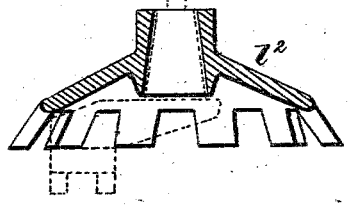
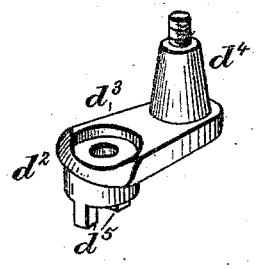
WITNESSES
Robert Everett,
George W. Rea.
INVENTOR
Andrew Runstetler,
By James L. Norris,
Attorney

UNITED STATES PATENT OFFICE.

ANDREW RUNSTETLER, OF DAYTON, OHIO, ASSIGNOR TO THE FARMERS FRIEND MANUFACTURING COMPANY, OF SAME PLACE.

WALKING CORN-PLANTER AND FERTILIZER-DISTRIBUTER.

SPECIFICATION forming part of Letters Patent No. 295,132, dated March 11, 1884.

Application filed August 30, 1883. (No model.)

*To all whom it may concern:*

Be it known that I, ANDREW RUNSTETLER, a citizen of the United States, residing at Dayton, in the county of Montgomery and State of Ohio, have invented new and useful Improvements in Walking Corn - Planters and Fertilizer-Distributers, of which the following is a specification.

The present invention relates to that class of walking corn-planters which employ a horizontally-revolving disk for delivering the corn or grain into the furrow, said disk being rotated by gearing arranged beneath the corn-hopper. It also relates more particularly to that type of planter in which provision is made for the attachment of a hopper containing devices for distributing a pulverulent fertilizer, which devices are actuated by gearing driven by the mechanism that serves to operate the seed-distributing devices.

The object of the invention is to improve upon the construction of the devices for discharging the seed in measured quantities; to provide simple and effective means for distributing the fertilizer and obviate the clogging thereof; also, to regulate the discharge of the fertilizer; furthermore, to provide a frame for the corn-planting and fertilizer-distributing devices which is strengthened and braced by devices serving to hold the furrow-opening shoe and apply the draft.

To these ends the invention consists in the construction and combination of devices which will be hereinafter more fully described, and then set forth in the claims.

Figure 1:
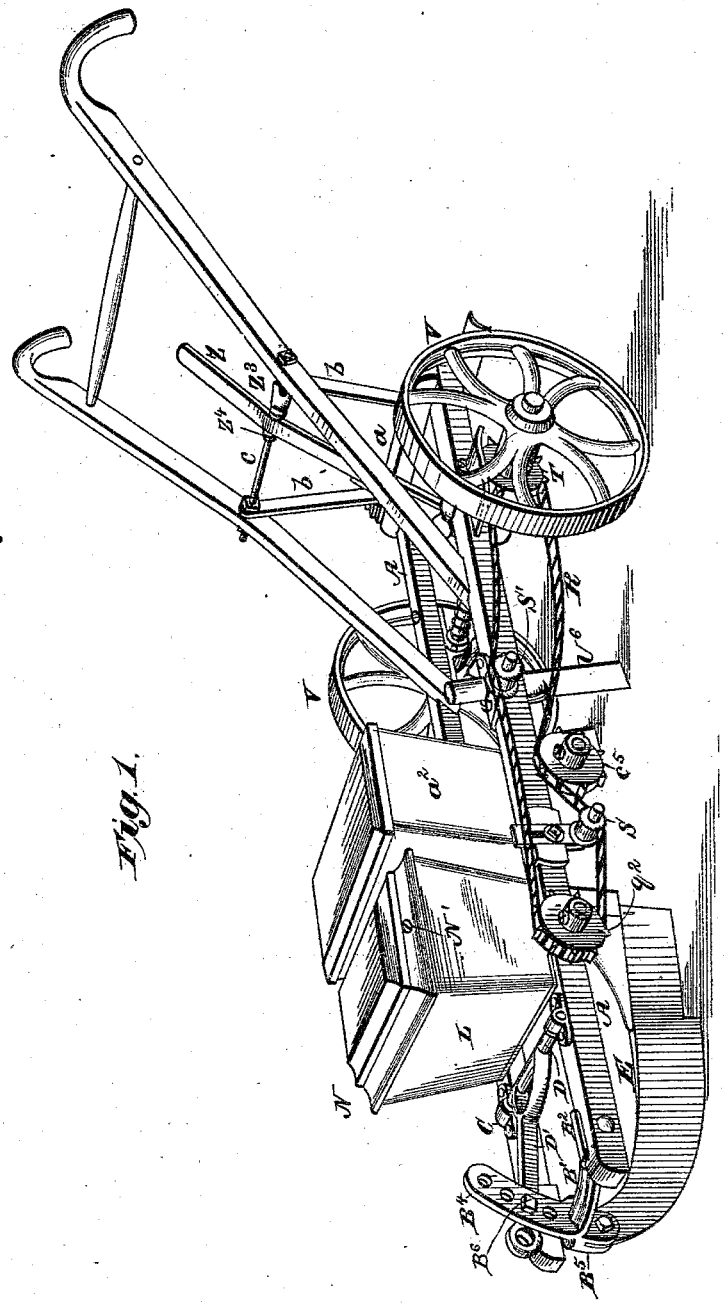
Figure 2:
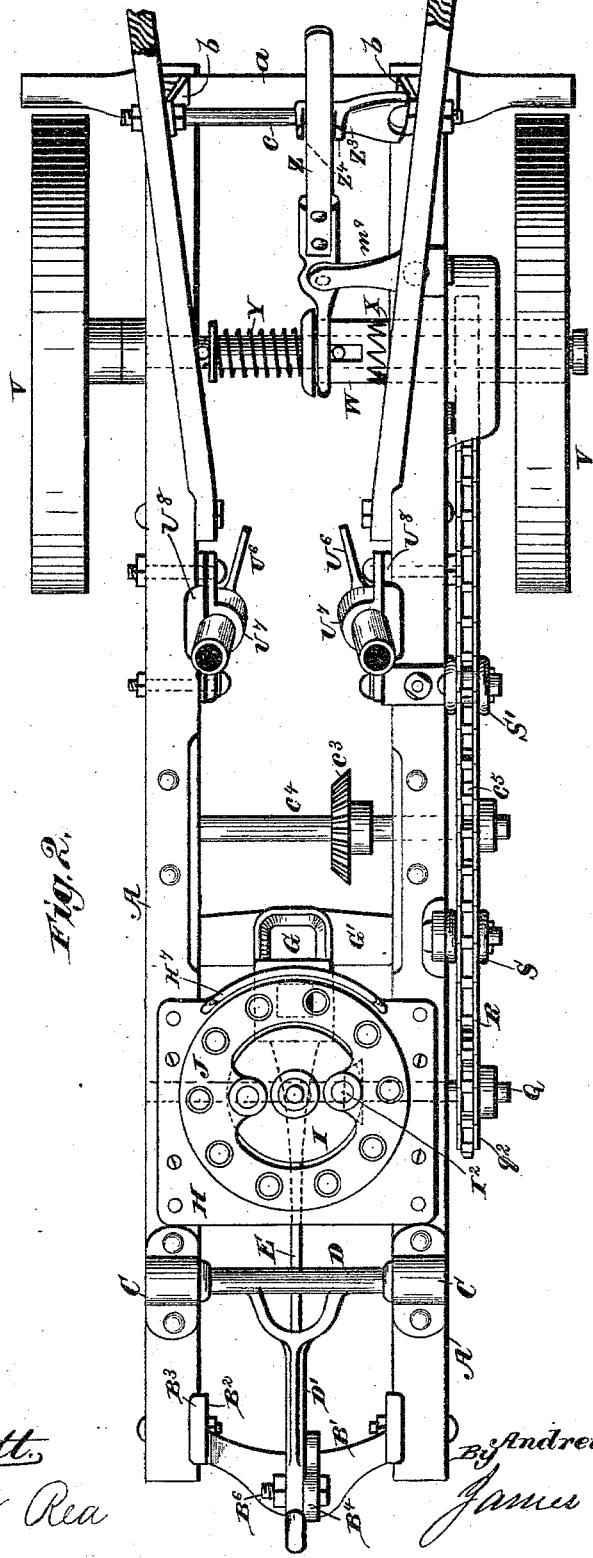
Figure 3:
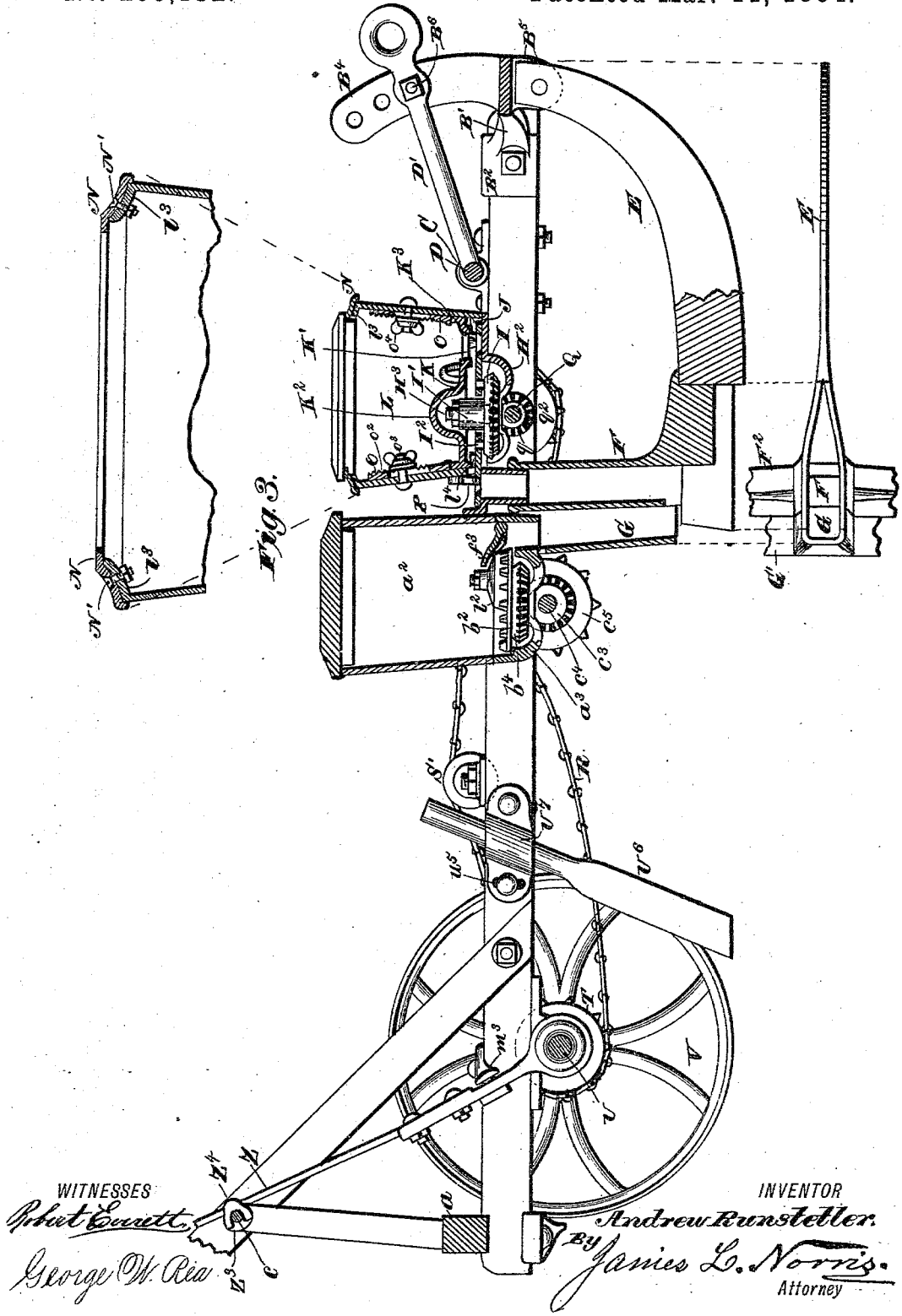

In the drawings, Figure 1 is a perspective view of my machine arranged for planting corn and a fertilizer. Fig. 2 is a plan or top view of my machine arranged for planting corn only, the hopper being removed to show the distributing-disk, the portion of the corn and fertilizer spouts or boots, and the changed position of the driving-chain and tightening-pulleys. Fig. 3 is a longitudinal sectional view through a machine arranged for dropping corn and distributing a fertilizer. Fig. 4 is a detail view of the slotted cap or covering-plate arranged over the corn-distributing disk, the spring-actuated cut-off and its casing being shown partially in section. Fig. 5 is a transverse sectional view of the fertilizer-hopper and its distributing devices. Fig. 6 is a bottom view of said hopper, showing the bearing for the distributing-disk, the discharge-spout, and the lever mechanism for adjusting the gate which regulates the discharge of the fertilizer. Fig. 7 is a detail face view of the fertilizer-delivery disk and the superposed disk for expelling the fertilizer from said disk into the discharge-spout. Fig. 8 is a section of said expelling device. Fig. 9 is a detail view of the stationary crank-arm, having a conical hub or boss on which said expelling device turns.

The letter A designates a pair of parallel beams, which are connected at their rear ends by a cross-bar, $a$, and carry appropriate guide-handles that are supported by vertical braces $b$, secured to said cross-bar and to a horizontal rod, $c$, passing through the handles.

At the front end of the beams A is arranged a casting, which comprises a horizontal bar, B', having vertical end plates, B², provided with top and bottom horizontal flanges, B³, a centrally-located vertical arm, B⁴, and ears or flanges B⁵ on the under side of the bar B'. The flanged end plates of the aforesaid casting receive the ends of the beams, and bolts passing through said beams and end plates serve to hold the casting in position. In rear of the front casting are arranged pillow-blocks C, which are secured to the tops of the beams, and receive the journal ends of a transverse shaft, D, having a central forwardly-extending arm, D'. This arm rests against the side of the arm B⁴ of the front casting, and is secured thereto by a bolt, B⁶, passed through both arms. Several holes are made in the arm B⁴, so that the bolt can be shifted into either of the same to hold the arm D' at different elevations. This arm D' has an eye or hook at its front end, to which the draft is applied, and hence it follows that by shifting said arm up and down the draft can be applied high or low, to suit the exigencies of the case. The front casting and the pillow-blocks, in which the shaft of the draft-arm can rock or turn, subserve, in addition to their primary functions, to give strength and rigidity to the front of the frame, or the beams forming the latter. A furrow-opening shoe or runner, E, is secured at its front or upper end between the ears or flanges B⁵ of the front casting, and at its rear or lower end this shoe is furcated in the customary manner, and is secured to a horizontal bottom extension of the corn or seed delivery spout or boot F. This spout F has horizontal arms or plates F² near its upper end, which serve, in connection with suitable screws, to secure it to the under side of the beams A. In rear of the spout F, and abutting against the same, is a second spout or boot, G, which also is provided with arms G', for attaching it to the beams.

A metallic plate, H, constituting the bottom of a corn or grain hopper, L, is securely attached to the beams A, and has an apertured central portion, in which operates a large crown-wheel, I, having its upper face made smooth or toothless, and provided with a central tubular boss or hub, I', and with two studs, I². The crown-wheel acts as a carrier for a horizontal seed distributing disk or ring, J, which has apertures for the reception of the seed, and two other apertures for fitting it on the studs I² of the crown-wheel. In this manner the seed-disk is easily applied, so that disks with differently-sized seed-holes can be used in an interchangeable manner. The apertured center of the plate H contains a bridge or curved bar, H², which forms part of said plate, and is cast or formed with a vertical cylindrical stud or bearing, H³. The hub I' of the crown-wheel or seed-disk carrier is fitted on this bearing H³ and turns thereon. A nut applied to a screw-threaded shank of the bearing H³ serves to hold the crown-wheel in place.

Above the plate H and seed-disk J is arranged a detachable plate, K, which conforms in its contour to the form of the hopper L, and is provided with a curved slot, K', and with a central portion having a hollow cap, K², which receives the hub I' of the crown-wheel or seed-disk carrier. This plate is, furthermore, provided with vertical flanges K³, which border the curved slot K', and serve, in connection with a cap-plate, K⁴, having side flanges, to form a shell or casing, in which is arranged a spring-pressed cut-off, M, or device for guarding against the entrance of more seed into the discharge-passage than is contained in the holes in the seed-disk as they pass under said cut-off. This cut-off is formed by a plate that has gudgeons $m$, which are received by notches in the cap-plate K⁴, and a spring, $m^2$, arranged between the cut-off and cap-plate serves to press the cut-off upon the seed-disk. The gudgeons $m$ act as pivots for the cut-off, and the cap-plate as a means for holding it in place, and the cap-plate itself is formed with a horizontal arm, K⁵, which is secured to the plate K by a suitable screw or bolt.

The seed-hopper L is constructed of cast-iron, and has at its upper end an inwardly-projecting rim, N, which is bolted to flanges $l^3$, projecting from the upper edge of the body of the hopper. The said top rim, N, serves to receive and support the cover or lid of the hopper, and it is likewise attachable and detachable by means of the bolts N'. Further, by the provision of the attachable top rim, I am enabled to make the hopper-casting much lighter than heretofore, while it is also made stronger, and, besides, the rim reduces the size of the opening in the top of the hopper, so that a smaller lid can be used. Corner-plates $l^4$ at the bottom of the hopper serve as means for securing it to the plate H. The detachable plate K rests upon these corner-plates $l^4$, and is retained in position by means of vertically-adjustable presser bars or plates O, applied to the inner walls of the hopper. These presser-bars have vertical slots and corrugated faces $o^2$, the slots receiving screw-bolts $o^3$ projecting from the hopper-body, and the corrugated faces engaging with washers that are pressed against the same by winged nuts $o^4$ on the screw-bolts. The lower ends of the presser-bars bear against the plate K and serve to hold it in position within the hopper. At the rear or discharge side of the hopper is arranged a curved trough, which is formed by a vertical flange, H', on the portion of the plate H projecting beyond the hopper. In this trough or passage the seed-disk passes, and as the charges contained in its holes come over an aperture in the projecting portion of the plate H a gravitating finger or arm, P, pivoted to the rear of the hopper, drops into the hole in the disk and forces the charge into the discharge-spout leading to the ground. This finger P has a weighted head, and operates automatically, the portion thereof which enters the holes in the disk being so shaped as to ride easily over the same.

Beneath the hopper and beams A is arranged a transverse shaft, Q, which has a bevel-gear wheel, $q$, that meshes into the crown-wheel, and serves to rotate the same and the seed-dropping devices carried thereby. This shaft Q is provided with a sprocket-wheel, $q^2$, over which passes an endless chain, R, that is conducted over intermediate tightening-pulleys, S S', and over a sprocket-wheel, T, on the shaft or axle U of a pair of transporting or ground wheels, V, arranged at the rear of the frame. These wheels and longitudinal gearing above described serve to actuate the seed-dropping devices during the forward movement of the machine. A sliding clutch-collar, W, on the axle U is, by a spiral spring, Y, encircling said shaft, pressed against a stationary clutch-collar, X, on one of the beams, so as to effect the operation of the devices by the forward movement of the machine. This clutch-collar W turns in the eye or fork of a shifting lever, Z, which is fulcrumed in a bracket, $m^9$, projecting from one of the beams A, and is received near its upper end upon a sleeve, Z³, fitted on the horizontal connecting-rod $c$ of the guide-handles. This sleeve Z³ has stops Z⁴, for retaining the lever in different positions, and thus holding the sliding spring-pressed clutch-collar engaged or disengaged from the stationary clutch-collar. In front of the axle of the driving-wheels are arranged two vertical blades or wings, U⁶, which have shanks that are held in clamps or boxes U⁷, applied to the inner sides of the beams A. These clamps are pivoted to bearing-plates U⁸ on the beams A, and have each a curved slot, $u^5$, through which passes a bolt that extends through the beam and has a tightening-nut. The shanks of the blades U⁶ are retained between the bearing-plates U⁸ and clamps U⁷, the latter being suitably shaped to conform to the shape of these shanks. By loosening the bolts of the clamps, the blades U⁶ can be shifted up and down in a straight line, to vary the depth of penetration of the same into the ground, and by turning the slotted portion of the clamps on the retaining-bolt the angle of the blades can be changed. In this manner effectual provision is made for covering the furrow or throwing earth upon the seed after it has been deposited.

I have in the above-detailed description referred altogether to the adaptation of the machine for planting corn or other seed, and will now describe the devices and changes necessary to adapt it for planting seed and a pulverulent fertilizer. A hopper, $a^2$, having a suitable cover and an apertured bottom plate, $a^3$, contains a distributing-disk, $b^2$, the upper face of which has teeth or projections $b^3$ near its periphery. To the under side of this toothed disk is secured, by screws or other suitable means, a beveled spur-rim, $b^4$, which engages with a bevel-gear wheel, $c^3$, on a shaft, $c^4$, having a sprocket or chain wheel, $c^5$. The toothed disk $b^2$ has a circular central opening, which receives a hub or boss, $d^2$, on a crank-arm, $d^3$, the latter also bearing a tapering arm or wrist-pin, $d^4$. Two lugs or projections, $d^5$, on the boss $d^2$ enter correspondingly-shaped slots, $a^6$, of a bridge-piece, $a^5$, of the apertured bottom plate, $a^3$, for connecting said boss $d^2$ and its other members to said bridge-piece, and preventing it from turning therein, a bolt passing through the boss $d^2$ and bridge-piece holding the respective parts together. The wrist-pin or tapering arm $d^4$ receives the correspondingly-shaped hub or central portion of a second disk or circular plate, $l^2$, which has downwardly-projecting teeth on its edge or periphery, that operate or glide between the teeth of the disk $b^2$. When the latter is turned by the aforementioned gearing, the position of the plate $l^2$ on the stationary crank-arm will cause the teeth thereof to slide or move between the teeth of the disk $b^2$ and expel the material contained between the same into a spout or nozzle, $a^7$, of the bottom plate, $a^3$, of the hopper, to be delivered into the spout or tube leading to the ground. In order to regulate or render uniform the discharge of material from the hopper, I locate in proper relation to the spout $a^7$ an adjustable gate or plate, $f^3$, which laps over the expelling device $l^2$, and prevents the superincumbent material from passing into the discharge-aperture, except in the proper way by means of the feed-disk. This gate $f^3$ is curved and extends close to the expelling device $l^2$, and it has gudgeons or journals $f^4$, which turn in bearings on the under side of the hopper, and one of these journals is connected with or forms part of a crank-shaft, $f^5$, to which is applied an arm, $f^6$, that has a slotted plate, $f^7$, which receives a screw-bolt, $f^8$, projecting from the hopper. By means of this slotted plate and crank-arm the gate $f^3$ can be rocked in its bearing, so as to change its position in relation to the expelling device and vary the amount of material discharged from the hopper, and by the aforesaid screw-bolt and its nut the gate is held in a stationary position.

It will be evident that the gearing for operating the devices carried by the fertilizer-hopper is always in position on the frame, and all the change necessary to take the drive-chain from the position employed for actuating the seed-dropping devices only is to invert the adjustable tightening-pulley and bring it beneath the beam, as is shown in the drawings. This pulley is mounted on a slotted arm, which is fitted in a keeper on the beam, and is held in position by a bolt passing through the slotted arm.

The cast-iron hopper, with its attachable and detachable inwardly-projecting top rim, can of course be used in one or two horse planters without changing the character of this feature of my invention.

Having thus described my invention, what I claim is—

1. The seed-hopper L, composed of a metal casting having at its upper edge an attachable inwardly-projecting top rim, for reducing the size of the lid-opening and supporting the lid, substantially as described.

2. The cast-iron or metallic hopper L, having flanges $l^3$ at its upper edge and an inward-projecting top rim, N, bolted to said flanges, for reducing the size of the lid-opening and supporting the lid, substantially as described.

3. The combination of a detachable seed-hopper, a stationary apertured plate forming the bottom thereof, and having an attached bridge-piece provided with a stationary journal or bearing, a crown-wheel having a hub mounted on the journal or bearing and provided with vertical studs on its upper side, a seed-dropping disk extending through the hopper and having a central aperture, perforations at the sides thereof, through which the hub and studs of the crown-wheel pass, and a plate covering the hub of the crown-wheel and its journal, substantially as described.

4. The combination of a detachable seed-hopper, a stationary apertured plate forming the bottom thereof, and having an attached bridge-piece provided with a stationary journal or bearing, a crown-wheel having a hub mounted on the journal or bearing, a seed-dropping disk mounted on the hub of the crown-wheel, devices rigidly but detachably connecting the disk with the crown-wheel, outside the hub thereof, and a plate having a hollow cap receiving the hub of the crown-wheel and its journal or bearing, substantially as described.

5. The combination of a seed-hopper having corner-lugs at its bottom, a plate detachably arranged on said lugs and constructed with a hollow closed cap, a curved slot, and flanges bounding the sides of the slot, a cap-plate, a spring cut-off pivoted in the cap-plate, an apertured plate forming the bottom of the seed-hopper and supporting a stationary journal or bearing, a crown-wheel having a hub mounted on said journal, and a seed-dropping disk detachably mounted on the crown-wheel, said journal or bearing and crown-wheel hub projecting upward through the hopper-bottom plate into the hollow cap of the cut-off-carrying plate, substantially as described.

6. In a seed-hopper, the combination of the front casting, consisting of transverse bar having vertical end plates, upwardly-projecting arm, and downwardly-extending ears, with a draft-arm, furrow-opener, and parallel beams, substantially as described.

7. In a seed-planter, the combination of the pillow-blocks, the transverse shaft fitted therein, and the draft-arm forming part of said transverse shaft, with the parallel beams and a front support for the draft-arm, substantially as described.

In testimony whereof I have hereunto set my hand in the presence of two subscribing witnesses.

ANDREW RUNSTETLER.

Witnesses:
J. F. CAMPBELL,
GEORGE O. WARRINGTON.